US006203364B1

(12) United States Patent
Chupak et al.

(10) Patent No.: US 6,203,364 B1
(45) Date of Patent: Mar. 20, 2001

(54) ELECTRICAL CONNECTOR HAVING SLIDE CLIP ATTACHMENT

(75) Inventors: John M. Chupak, West Middlesex, PA (US); Mark D. McCall, Youngstown, OH (US); Andreas Sikora, Hagen (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/415,981

(22) Filed: Oct. 12, 1999

(51) Int. Cl.[7] .......................... H01R 13/60; H01R 13/73; H02B 1/01

(52) U.S. Cl. ............................................ 439/527; 439/571

(58) Field of Search .................................... 439/571, 542, 439/567, 570, 527; 403/388

(56) References Cited

U.S. PATENT DOCUMENTS 5,078,622 * 1/1992 Hunt, III et al. .................... 439/589
5,636,937 * 6/1997 Zemlicka ............................. 403/388

* cited by examiner

*Primary Examiner*—Brian Sircus
*Assistant Examiner*—Chandrika Prasad
(74) *Attorney, Agent, or Firm*—Richard A. Jones

(57) ABSTRACT

An electrical connector assembly having mateable male and female connector members includes a separate slide clip component that is received in a channel of the male connector and is provided with attachment features for mounting the assembly to support structure. The slide clip and channel include mateable detent and bump lock projection features that engage when the slide clip is fully installed in the channel to lock the slide clip against removal.

13 Claims, 4 Drawing Sheets

ELECTRICAL CONNECTOR HAVING SLIDE CLIP ATTACHMENT

TECHNICAL FIELD

This invention relates to electrical connectors of the type having male and female connector members with electrical terminals that mate when the connector members are joined, and more particularly to such connectors employing a slide clip-type mounting system for securing the connector assembly to support structure

RELATED PRIOR ART

Electrical connectors of the general type involved with the present invention include matable male and female connector members each with electrical terminals that are coupled when the connector members are joined to establish an electrical connection therebetween. The smaller male connector member plugs into a socket of the female connector member, such that there is a certain amount of overlap of the connector members at the joint. The overlapping regions often include matable locking features that engage to lock the members in the fully assembled condition. Some means are also typically provided for mounting the connector assembly on adjacent support structure, such as on a body panel, support bracket, etc. of a vehicle or the like. In one known mounting system, the male connector is formed with an external channel in which a separate slide clip piece is slidably received. Suitable attachment features, such as a push-in Christmas tree-type fastener, are molded integrally with the clip for mounting the connector assembly on the support structure. A resilient lock arm portion of the clip projects beyond the channel in the direction of the female connector member and carries a locking shoulder adjacent its free end. The locking shoulder engages a locking projection provided on the male connector member to secure the slide clip within the channel. The locking projection is formed along an exposed portion of the male connector body between the channel and the overlap region.

In applications where the connectors are small or comparably short in length, there often is not room enough adjacent the overlap region of the connector members to provide the needed locking projection on the male connector member. Without the locking projection, there is no means for securing such a slide clip to such a male connector member. Such means are provided by the present invention.

SUMMARY OF THE INVENTION

An electrical connector assembly according to the invention includes male and female connector members, which are matable for coupling corresponding electrical terminals. An external slide channel on the male connector member receives a slide clip having attachment features for mounting the connector assembly on adjacent support structure. Mating detent and bump lock projection features are provided on the slide clip and channel which engage when the slide clip is slid into the channel for retaining the slide clip against removal from the channel.

The invention has the advantage of providing mating detent and bump lock projection features on the slide clip and channel which enable clips having attachment features to be used on small connectors and tho se otherwise having insufficient room to accommodate the provision of the usual locking, projection on the male connector member.

According to a preferred embodiment of the invention, the detent features are provided on the slide clip. Such clip can then further be formed with the traditional lock arm feature, providing a universal slide clip device that can be used both on connectors with and without a corresponding traditional locking projection on the male connector member.

BRIEF DESCRIPTION OF THE DRAWINGS

These and other advantages and features of the present invention will be more readily appreciated when considered in connection with the following detailed description and drawings, wherein.

DETAILED DESCRIPTION OF PREFERRED EMBODIMENT

Figure 1:
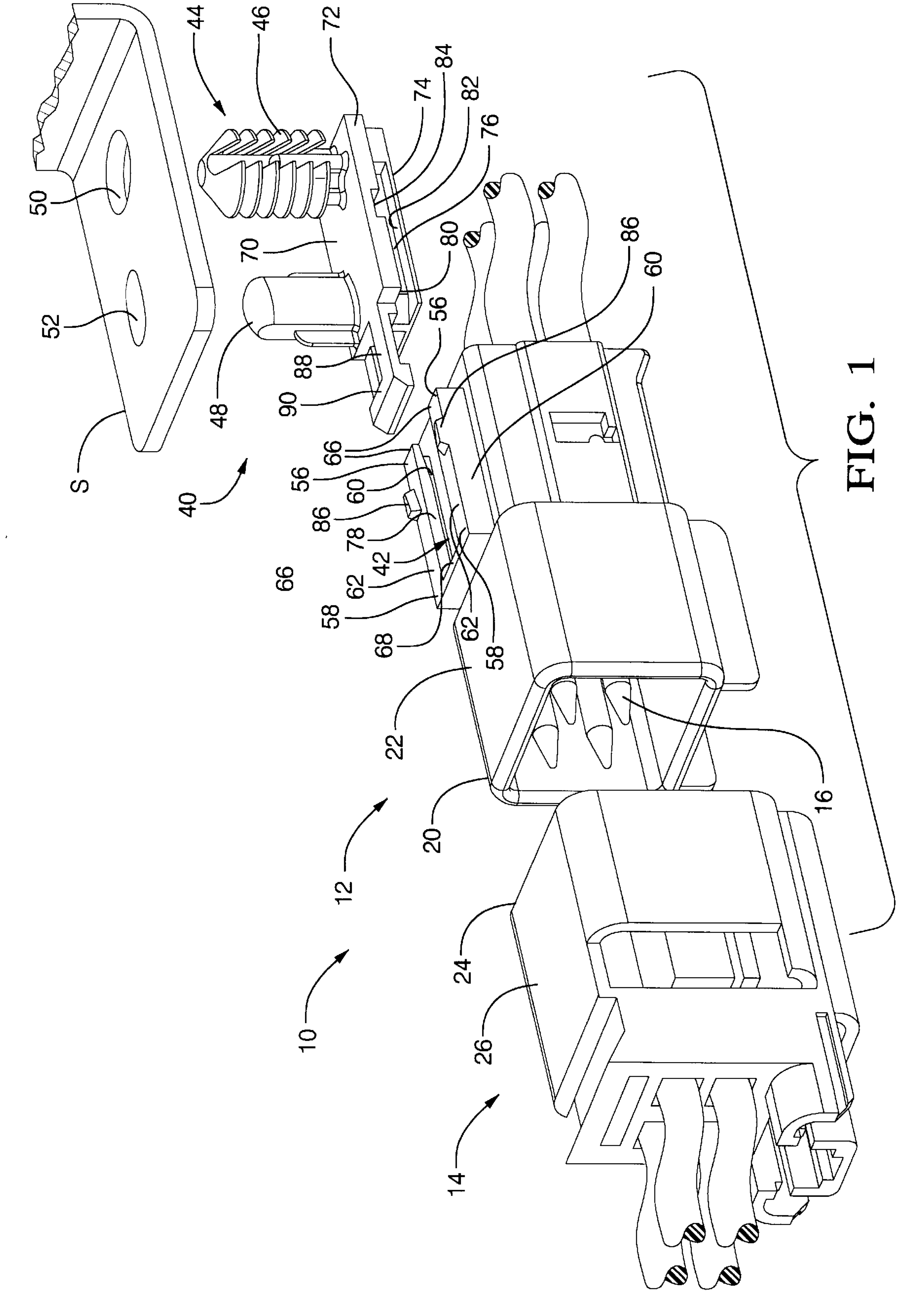
FIG. 1 is an exploded fragmentary perspective view of a connector assembly constructed according to a presently preferred embodiment of the invention.

An electrical connector assembly constructed according to a presently preferred embodiment of the invention is indicated generally at 10 in the drawings and comprises male and female connector members 12, 14, each having electrical terminals 16, 18, respectively at the ends of lead wires that couple when a plug end 20 of the male connector body 22 is extended into a corresponding socket end 24 of the female connector body 26 to establish an electrical connection therebetween in a manner typical of such connectors. When assembled, the socket portion 24 of the female connector 14 overlaps the plug end 20 of the male connector 12. An exposed portion 28 of the male connector 12 extends longitudinally from the female connector 14 adjacent the overlap region of the male and female connector members 12, 14.

Figure 3:
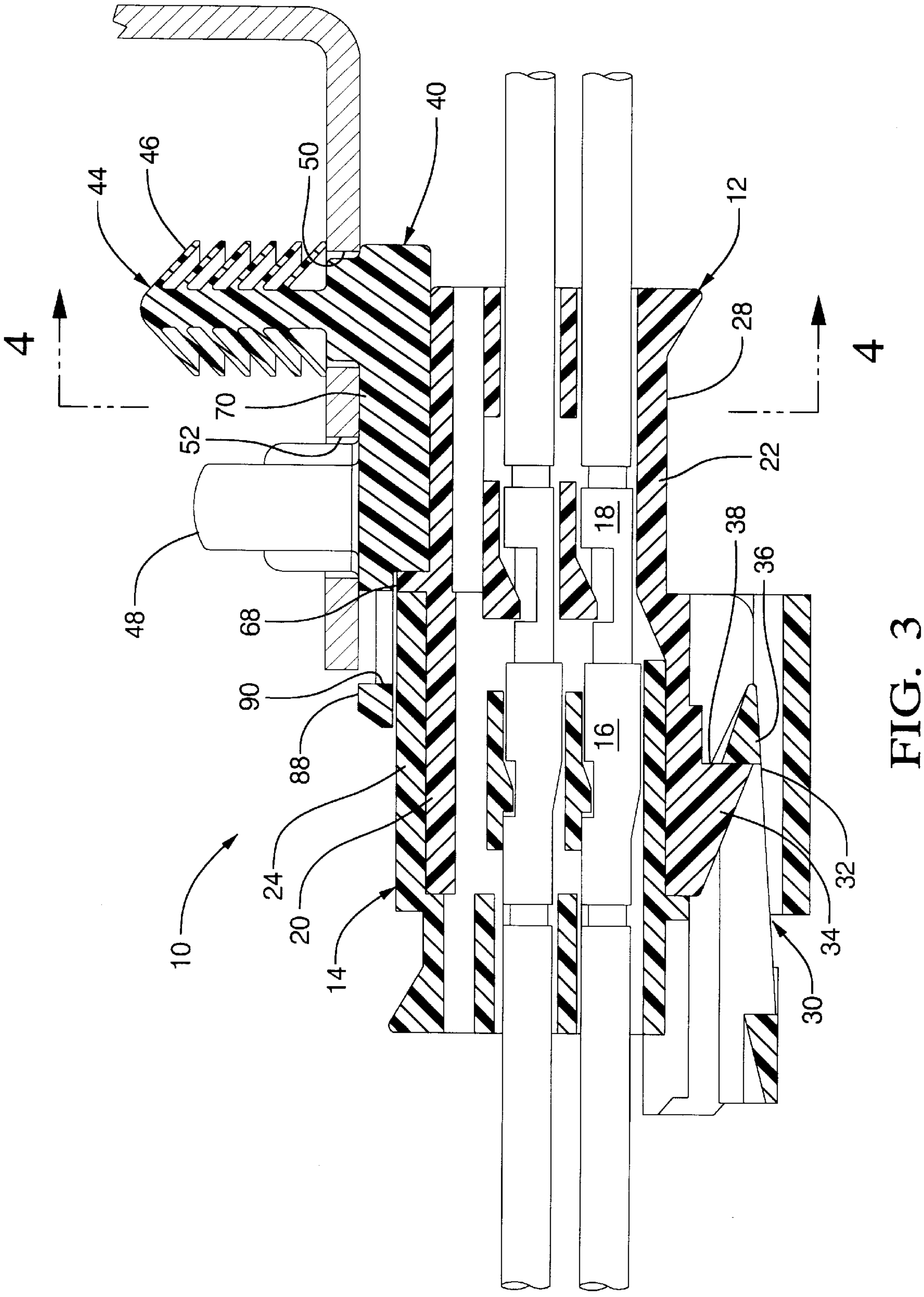
FIG. 3 is a longitudinal cross-sectional view taken generally along lines 3—3 of FIG. 2.
Figure 4:
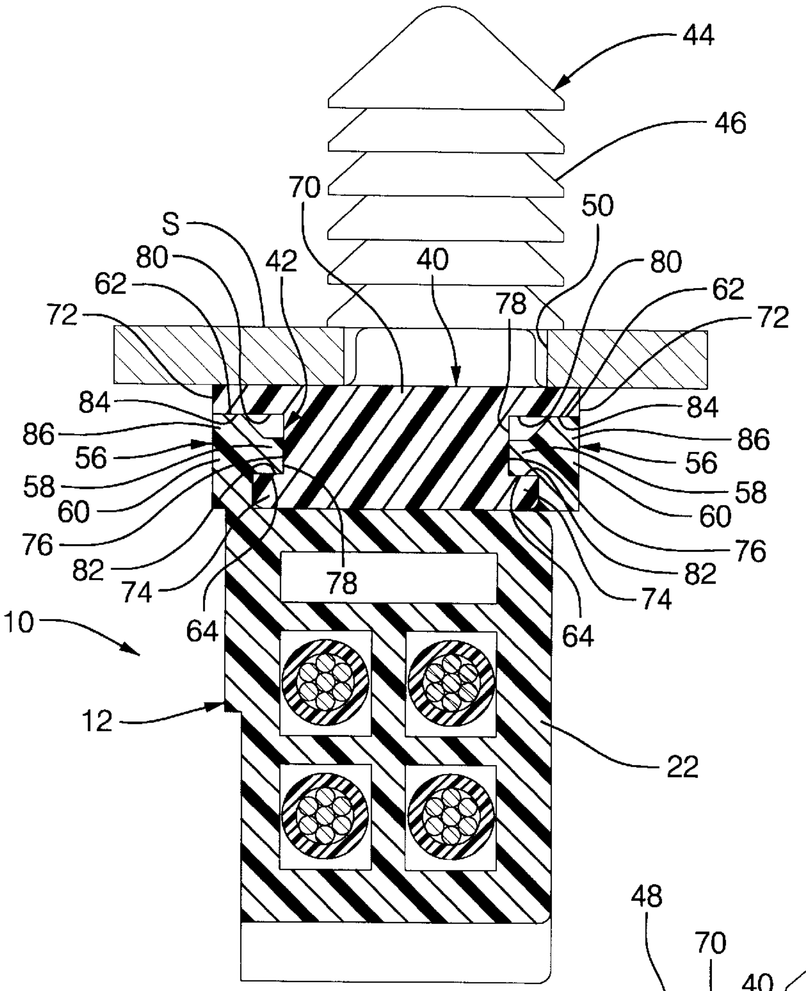
FIG. 4 is a lateral cross-sectional view taken generally along lines 4—4 of FIG. 2.

The connector members 12, 14 are locked in the fully mated position by a lock 30, shown in FIG. 3, that comprises a flexible lock arm 32 cantilevered from the female connector member 14 and a corresponding lock ramp 34 provided on the male connector member 12. The lock arm 32 has a slot presenting a lock bar 36 that rides over and engages a shoulder 38 of the lock ramp 34 when the connector members 12, 14 are fully mated to secure the members 12, 14 in the fully assembled state.

The assembly 10 further includes a separate slide clip member 40 that is slidably received in an external channel 42 provided on the male connector member 12. The slide clip 40 is formed with attachment features 44 that are operative for mounting the connector assembly 10 to adjacent support structures S, such as a body panel or support bracket or the like of a vehicle. The attachment features 44 are preferably molded as one piece with the slide clip 40 and are configured to accommodate the particular mounting requirements for each application. As an example, the illustrated embodiment shows the attachment features 44 as comprising a push-in Christmas tree-type fitting 46 in conjunction with a stabilizer post 48 which may be extended into corresponding apertures 50, 52 of the support structure S, as shown best in FIG. 1. This is but one example, and it is to be understood that other attachment configurations are contemplated by the invention.

The channel 42 is formed on the exposed portion 28 of the male connector member 12 adjacent the overlap region. The channel 42 comprises laterally spaced rails 56 having upstanding side wall portions 60 that project from the body 22 of the male connector 12 and upper wall portions 58 that extend laterally inwardly from the side wall portions 60 in spaced relation to the body 22. The upper wall portions 58 present exposed outer surfaces 62 and inner surfaces 64 which are both spaced from the body 22 of the male connector member 12. The rails 56 have an open end 66 for receiving the slide clip 40 into the channel 42, and a longitudinally opposite closed end provided by a transverse end wall 68 of the channel 42. By "external channel," it is meant that the slide clip 40 attaches to the outside region of the male connector member 12, rather than extending into the internal cavities of the male or female connector members 12, 14 in which the terminals 16, 18 are housed. In this way, the channel 42 is accessible to the slide clip 40 with or without the connector members 12, 14 being fully assembled.

The slide clip 40 comprises a molded plastics member, as do the male and female connector members 12, 14. The slide clip 40 has a generally flat, longitudinally extending main body 70 on which the attachment features 44 are formed as well as the channel 42. The main body 70 includes upper and lower side portions 72, 74 provided on the laterally opposite side edges of the body 70. The portions 72, 74 are each separated by a longitudinal recess or groove 76. The spacing between the grooves 76 corresponds closely to the spacing between laterally inward edges 78 of the upper wall portions 58 of the channel 42. The spacing between facing, inward reaction surfaces 80, 82 of the upper and lower side portions 72, 74, respectively, of the slide clip 40 correspond closely to the spacing between the outer and inner surfaces 62, 64 of the upper wall portions 58.

Figure 2:
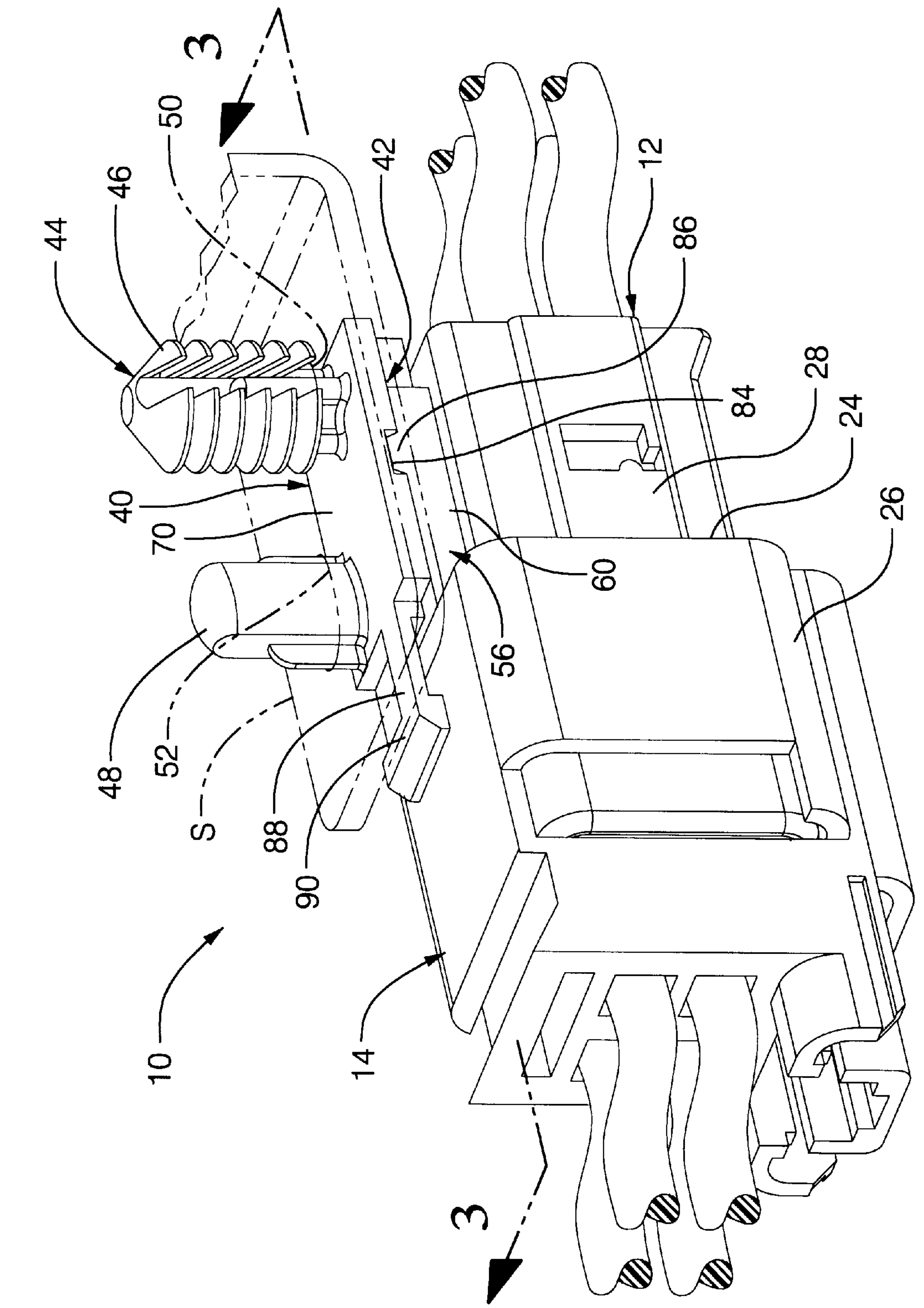
FIG. 2 is a fragmentary perspective view of the connector of FIG. 1 shown in the assembled condition.

As shown best in FIGS. 2 and 3, the slide clip 40 is assembled with the male connector member 12 by extending the clip 40 into the open end 66 of the channel 42. The upper and lower side portions 72, 74 of the slide clip 40 straddle the opposite sides of the upper wall portions 58 of the channel rails 56, such that the inward edges 78 of the upper wall portions 58 are received in the groove 76 of the slide clip, and the inward reaction surfaces 80, 82 of the side portions 72, 74 engage the outer and inner surfaces 62, 64, respectively, of the upper wall portions 58. Such enables the slide clip 40 to slide freely in the longitudinal direction, but secures the slide clip laterally in the channel 42. According to the invention, the slide clip 40 and channel 42 are provided with matable features which interlock when the slide clip 40 is fully assembled with the channel 42 to secure the slide clip 40 against removal in the reverse longitudinal direction. The matable features include at least one and preferably a pair of detents 84, and at least one and preferably a pair of corresponding bump lock projections 86 provided on the slide clip 40 and channel 42.

The detents 84 are preferably provided on the slide clip 40 along the side portions, and particularly along the inward reaction surfaces 80 of the upper side portions 72 of the slide clip 40. The detents 84 are preferably in the form of recesses that extend inwardly of the plane of the reaction surfaces 80 so as to maintain generally planar, parallel reaction surfaces 80, 82 of the side portions 72, 74. The detents 84 are preferably molded integrally with the slide clip 40 at the time of its formation.

The bump lock projections 86 are preferably provided on the channel 42 and particularly projecting from the outer surfaces 62 of the upper wall portion 58. As the slide clip 40 is extended into the channel 42, the projections 86 engage the inward reaction surface 80 of the upper side portions 72 of the slide clip 40, imparting a wedging force which urges the upper and lower side portions 72, 74 apart. The rails 56 and side portions 72, 74 yield somewhat to accommodate the passage of the bump lock projections 86 between the side portions 72, 74, until such point as the projections 86 drop into the detents 84, whereupon the wedging force is relieved and the rails 56 and side portions 72, 74 return to their unstressed, relaxed state, trapping the bump lock projections 86 within the detents 84 and thereby locking the slide clip 40 against removal longitudinally from the channel 42, or over insertion into channel 42. Preferably, the upper side portions 72 contact the support structure S when the attachment features 44 are fully engaged into apertures 50, 52. This contact prevents the upper and lower side portions 72, 74 from wedging apart after projection 86 snaps into detent 84. Therefore, in addition to attaching the slide clip 40 to a structure, the attachment features also assist in locking the slide clip 40 to the male connector 12.

Figure 5:
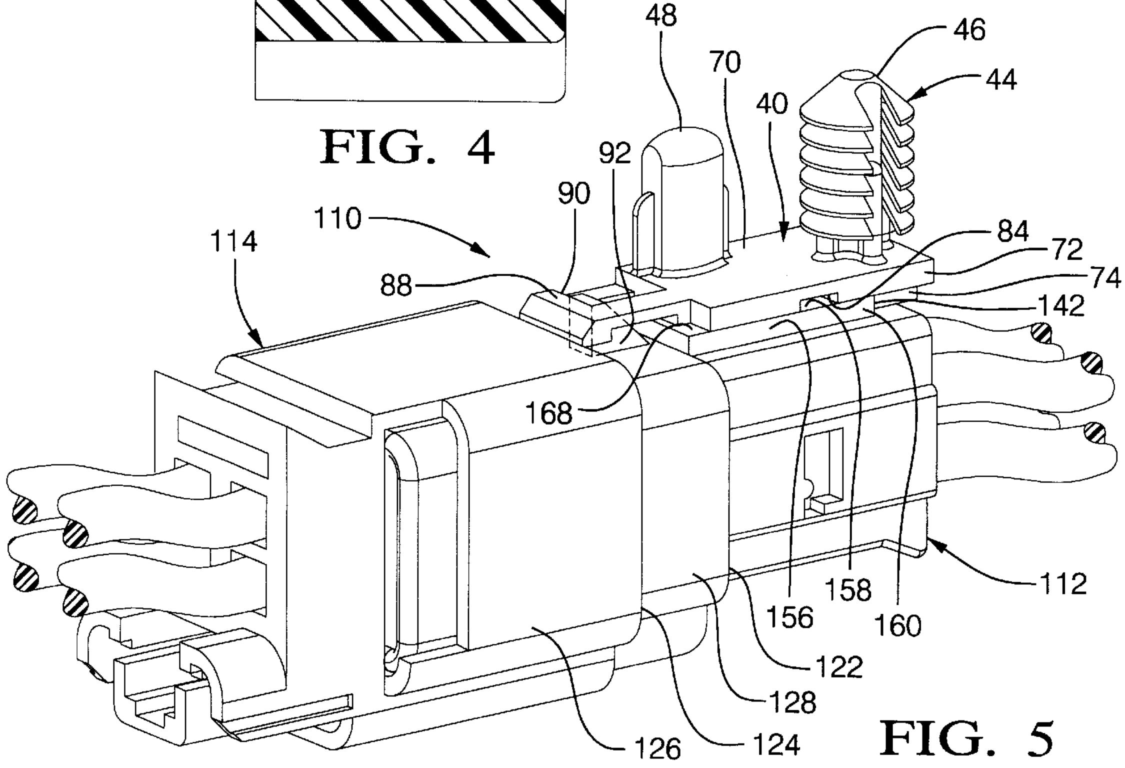
FIG. 5 is a fragmentary alternative connector assembly showing the same slide clip of FIGS. 1–4 coupled to a male connector member formed with a locking projection engaging the lock arm of the slide clip.

According to a further aspect of the invention, the slide clip 40 may include a resilient, cantilevered lock arm 88 projecting longitudinally beyond the slide clip body 70 and presenting a lock shoulder 90 adjacent its free end. As shown best in FIGS. 2 and 3, the lock arm 88 extends into the overlap region of the connector members 12, 14 in overlying relation to the companion female connector member 14. In the illustrated embodiment of FIGS. 1–4, the lock arm 88 does not function to secure the slide clip 40 to the male connector member 12, but is external to the connector members 12, 14 so as not to interfere with the connection of the members 12, 14. Rather, the provision of the lock arm 88 in conjunction with the detents 84 enables the slide clip 40 to be used in alternative connector applications in which there is sufficient length of the exposed portion of the male connector member 12 between the channel 42 and the overlap regions of the male and female connector members 12, 14 to accommodate the provision of the traditional locking projection on the male connector member 12 for engaging the lock shoulder 90 of the lock arm 88. FIG. 5 shows such an alternative arrangement wherein the same reference numerals are used to represent corresponding features with respect to the first embodiment of FIGS. 1–4, but those directed to features of the connector members are offset by 100. The same slide clip 40 is used. The male connector 112 has a locking projection 92 adjacent the overlay region of the connector members 112, 114 in position to engage the lock shoulder 90 of the lock arm 88. Note that the rails 156 of the channel 142 lack the bump lock projections 86 of the FIGS. 1–4 embodiment. Nonetheless, the same slide clip 40 can be employed since the detents 84 are recessed and these do not interfere with the installation and locking of the slide clip 40 within the channel 142. As such, the subject slide clip 40 serves a dual purpose as a universal slide clip component for both types of connectors (i.e., those with and without a locking projection for the lock arm 88).

The disclosed embodiment is representative of a presently preferred form of the invention, but is intended to be illustrative rather than definitive thereof. The invention is defined in the claims.

What is claimed is:

1. An electrical connector assembly comprising:

male and female connector members enageable with one another for coupling corresponding electrical terminals of said connector members to establish an electrical connection therebetween;

an external channel provided on said male connector member, said channel includes longitudinally extending rails having laterally spaced upper wall portions spaced from a body of said male connector member, said upper wall portions each having an outer exposed surface and an opposite inner surface;

a slide clip slidably disposed in said channel having attachment features for mounting said connector assembly on adjacent support structure; and a pair of mating detents provided on said slide clip; and a pair of bums lock projections provided on said channel to lock said slide clip against removal from said channel, said bump lock projections being formed on said outer surface.

2. The assembly of claim 1 wherein said slide clip includes upper side portions overlying said upper wall portions of said rails, said upper side portions presenting inward reaction surfaces facing said outer surfaces of said rails, said inward reaction surfaces being formed with said detents in position to engage said bump lock projections of said rails when said slide clip is fully disposed in said channel.

3. The assembly of claim 1 wherein said slide clip includes a lock arm projecting longitudinally toward said female connector member and having a locking shoulder adjacent a free end of said lock arm.

4. The assembly of claim 3 wherein a plug end of said male connector member is received in a socket end of said female connector member such that a portion of said female connector member overlaps said male connector member, said free end of said lock arm overlying said overlapping portion of said female connector member.

5. The assembly of claim 2 wherein the upper side portions contact the support structure.

6. An electrical connector assembly comprising:

a male connector member having electrical terminals;

a female connector member having electrical terminals, the male connector member engaged to the female connector member, the respective electrical terminals thereby coupled;

an external channel disposed on said male connector member, the external channel having longitudinally extending rails having laterally spaced upper wall portions spaced from a body of said male connector member, said upper wall portions each having an exposed outer surface and an opposite inner surface;

a slide clip engaged slideably in the channel, the slide clip having a main body having an upper side portion and a lower side portion separated vertically and extended longitudinally along the side of the clip, the upper and lower side portions each having opposing inward reactive surfaces defining a longitudinal groove, the inward reactive surface of the upper side portions overlying and facing the outer surface of the upper wall portions of the rails, the inward reactive surface of the lower side portions underlying and facing the inner surface of the upper wall portions of the rails;

at least one detent disposed on the inward reactive surface of the upper side portion, the detent being a recess;

at least one bump lock projection mated with the recess, the bump lock projection formed on the respective outer surface of the upper wall portion of the channel, the upper and lower side portions formed to resiliently separate vertically to accommodate the upper wall portion and the bump lock projection prior to the projection snapping into the recess;

a support structure having at least one aperture; and at least one attachment feature protruded rigidly from the slide clip and engaged through the aperture, the upper side portions of the slide clip contacting the support structure.

7. The electrical connector assembly as set forth in claim 6 wherein one recess is disposed on each reactive surface of the upper side portions of the slide clip, and one corresponding bump lock projection is disposed on each respective outer surface of the upper wall portions of the channel.

8. The electrical connector assembly as set forth in claim 7 wherein the slide clip has a cantilevered lock arm projecting longitudinally toward said female connector member, the lock arm having a locking shoulder disposed at the lock arm free end.

9. A slide clip for an electrical connector comprising:

a main body having an upper side portion and a lower side portion separated vertically and extended longitudinally to the side of the clip, the upper and lower side portions being vertically resilient, the upper and lower side portions each having opposing inward reactive surfaces defining a longitudinal groove;

attachment features formed unitarily and laterally positioned to the main body, the attachment features for mounting the slide clip on an adjacent support structure; and a cantilevered lock arm projected longitudinally away from the main body, the lock arm having a locking shoulder disposed at the lock arm free end.

10. The slide clip as set forth in claim 9 wherein the slide clip engages a male connector member having:

a body, an external channel having longitudinally extending rails having laterally spaced upper wall portions spaced from the body, the upper wall portions each having an exposed outer surface and an opposite inner surface, and a bump lock projection disposed on each outer surface of the upper wall portions, the bump lock projections mated with "detents disposed on each inward reactive surface of the upper side portion, the detents being" the recesses of the slide clip, the upper and lower side portions formed to resiliently separate vertically to accommodate the upper wall portion and the bump lock projection prior to the projection snapping into the recess.

11. The slide clip as set forth in claim 10 wherein the support structure has apertures, the attachment features engaged through the apertures, the upper side portions of the slide clip contacting the support structure.

12. The slide clip as set forth in claim 11 wherein the male connector member has a plug end received in a socket end of a female connector member, the lock arm projected longitudinally toward the female connector member, the locking shoulder disposed over and outwardly from the socket end.

13. The slide clip as set forth in claim 10 wherein the slide clip engages a male connector member having:

an opposite inner surface, and a locking projection extended rigidly from the body, the projection engaged to the locking shoulder of the lock arm.

* * * * *